UNITED STATES PATENT OFFICE.

ELEUTHERE PAUL DU PONT, OF MONTCHANIN, DELAWARE.

ENGINE-SUPPORT.

1,376,520.  Specification of Letters Patent.  Patented May 3, 1921.

Application filed March 10, 1920. Serial No. 364,631.

*To all whom it may concern:*

Be it known that I, ELEUTHERE PAUL DU PONT, a citizen of the United States, residing at Montchanin, county of New Castle, and State of Delaware, have invented a new and useful Improvement in Engine-Supports, of which the following is a full, clear, and exact description, reference being had to the accompanying drawings, which form a part of this specification.

The object of my invention is to provide a support for the rear end of automobile engines, and especially for the unitary type wherein the transmission is located directly behind the fly wheel and carried by the engine.

Heretofore, in automobile engine construction, it has been the practice to cast the fly wheel casing in two parts, integral with and as a part of the upper and lower halves of the engine crank case. Lugs are cast integral with the upper part of the fly wheel case for attachment to the frame to support the engine. The parts are bolted together and the transmission bolted to the case.

The fly wheel casing is necessarily formed of the same material as that of the crank case, for which aluminum gives the most satisfactory results. Aluminum, however, is expensive and is not sufficiently strong to serve as an efficient material to support the engine and transmission.

In accordance with my invention I provide a novel type of engine support, which may be made of pressed steel and which will not only combine present required lightness with greater strength, but which will be much cheaper in construction.

I will now describe my invention in connection with the accompanying drawings, in which I have illustrated a preferred embodiment thereof and in which,—

The upper and lower halves of the crank case $a$ are cast, preferably of aluminum, with horizontal side flanges $b$, and semi-circular end flanges $c$.

The transmission case $d$ is formed with a circular flange $f$ at one end.

Figure 1:
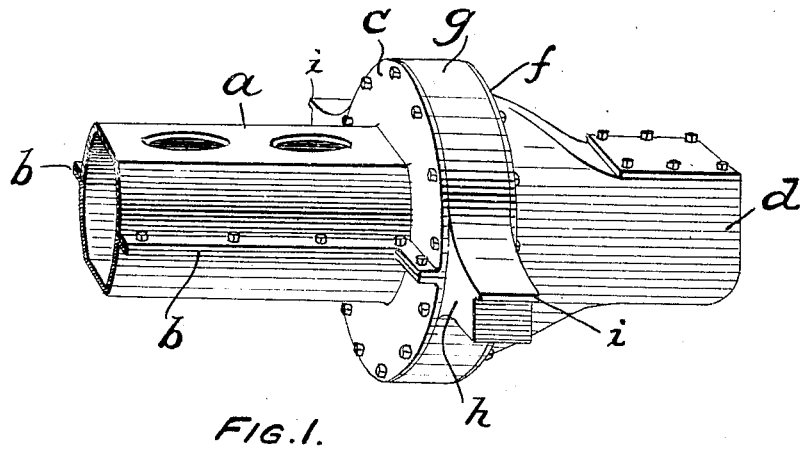
Figure 1 is a perspective view of an engine embodying my invention.
Figure 2:
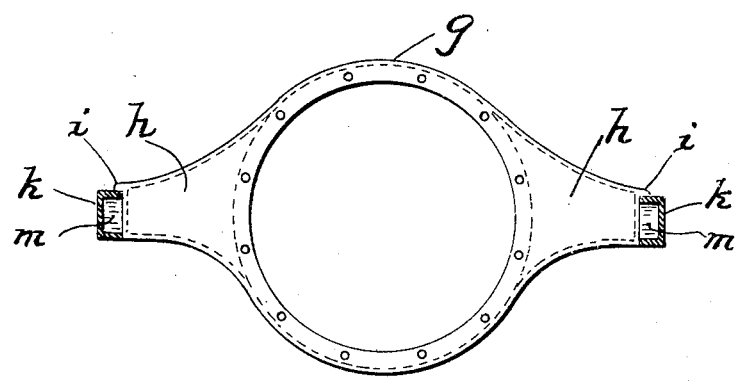
Fig. 2 is a rear view, partly in section, of my improved support.
Figure 3:
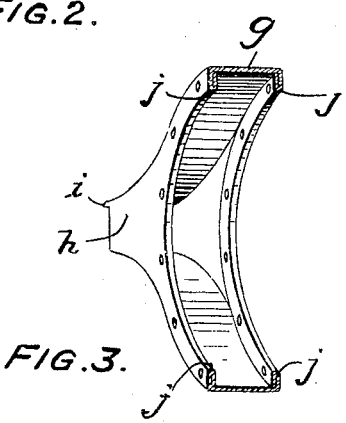
Fig. 3 is a cross-sectional view in perspective of my improved support.

The support formed from sheet metal in any suitable manner, by pressing and welding, comprises the circular body portion $g$, having the outwardly flared portions $h$, terminating in a lug $i$ on opposite sides thereof. Flanges $j$ are formed on the front and back of the body, by rolling the edges upon themselves to form flanges of double thickness, as shown in Fig. 3.

In the completed assembly the halves of the crank case are bolted together through the flanges $b$, thus forming a circular flange at one end, by the combining of semi-circular flanges $c$, to which the front flange $j$ of the support is bolted. The transmission case is bolted to the rear flange $j$ through its flange $f$. The flanges $i$ on the flared portions $h$ are adapted to rest on the top of frame $k$, in the channels of which are filler blocks $m$.

It will be noted that the support forms the body of the fly wheel case and serves to support the rear of the engine.

Having now fully described my invention, what I claim and desire to protect by Letters Patent is:

1. An engine support for automobiles comprising a hollow truss structure, said truss having a compression member and a tension member adapted to receive the fly wheel of the engine between them, side flanges connecting the compression and tension members to each other, there being an opening through both of the side members, a seat on each end of the truss structure for engaging the sills of an automobile frame, crank case supporting means on the truss surrounding the opening on one side of the truss structure, and similar supporting means on the other side member surrounding the other opening for supporting the transmission case.

2. An engine support for automobiles comprising a hollow truss structure for incasing the fly wheel, said truss having a compression member swelled upwardly about the fly wheel space, a tension member swelled downwardly about the fly wheel space, and side webs connecting the compression and tension members to each other, said webs having openings therethrough arranged to communicate with the engine crank case on one side and the transmission gear case on the other side.

3. An engine support for automobiles comprising a hollow sheet metal structure having a cylindrical body portion and a laterally extending wing of the same width as the body portion extending from each side of the body portion, a frame engaging seat on the end of each wing, there being a cylindrical opening through each end of the body portion, one of said openings being arranged to communicate with a gear shift casing when in position while the other opening is adapted to open into a crank case, one of said openings being large enough to permit the insertion and removal of an engine fly wheel, and a casing securing flange surrounding each opening.

4. An engine support for automobiles comprising a hollow sheet metal structure, having a cylindrical body portion and a laterally extending wing of the same width as the body portion extending from each side of the body portion, a frame engaging seat on the end of each wing, there being a cylindrical opening through each end of the body portion, one of said openings being arranged to communicate with a gear shift casing when in position while the other opening is adapted to open into a crank case, one of said openings being large enough to permit the insertion and removal of an engine fly wheel, and a reinforced casing securing flange surrounding each opening, said reinforce being formed by bending back upon itself the sheet metal surrounding the openings.

In testimony of which invention, I have hereunto set my hand, at Wilmington, Delaware, on this 5th day of March, 1920.

ELEUTHERE PAUL DU PONT.